Patented Nov. 17, 1931

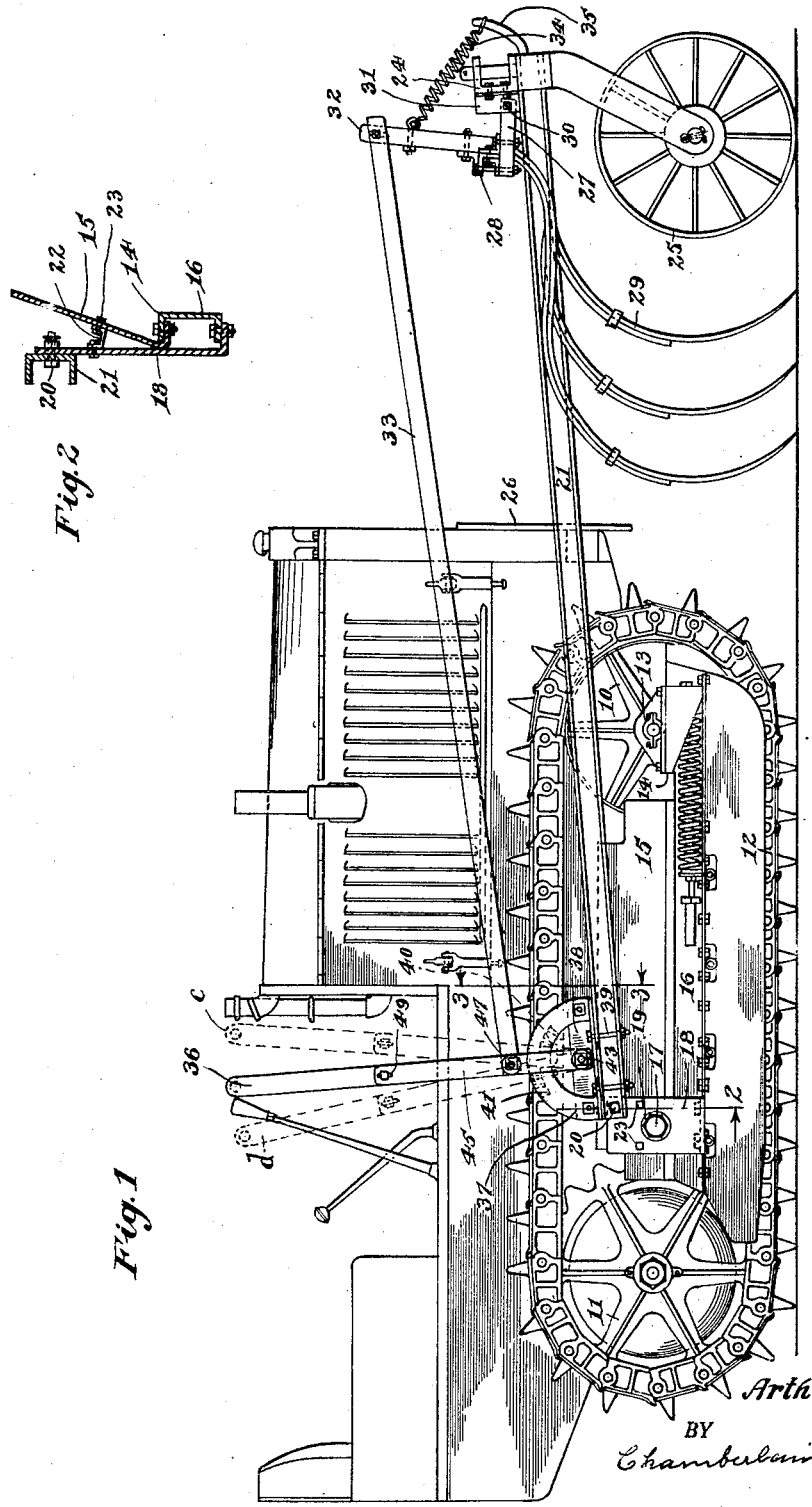

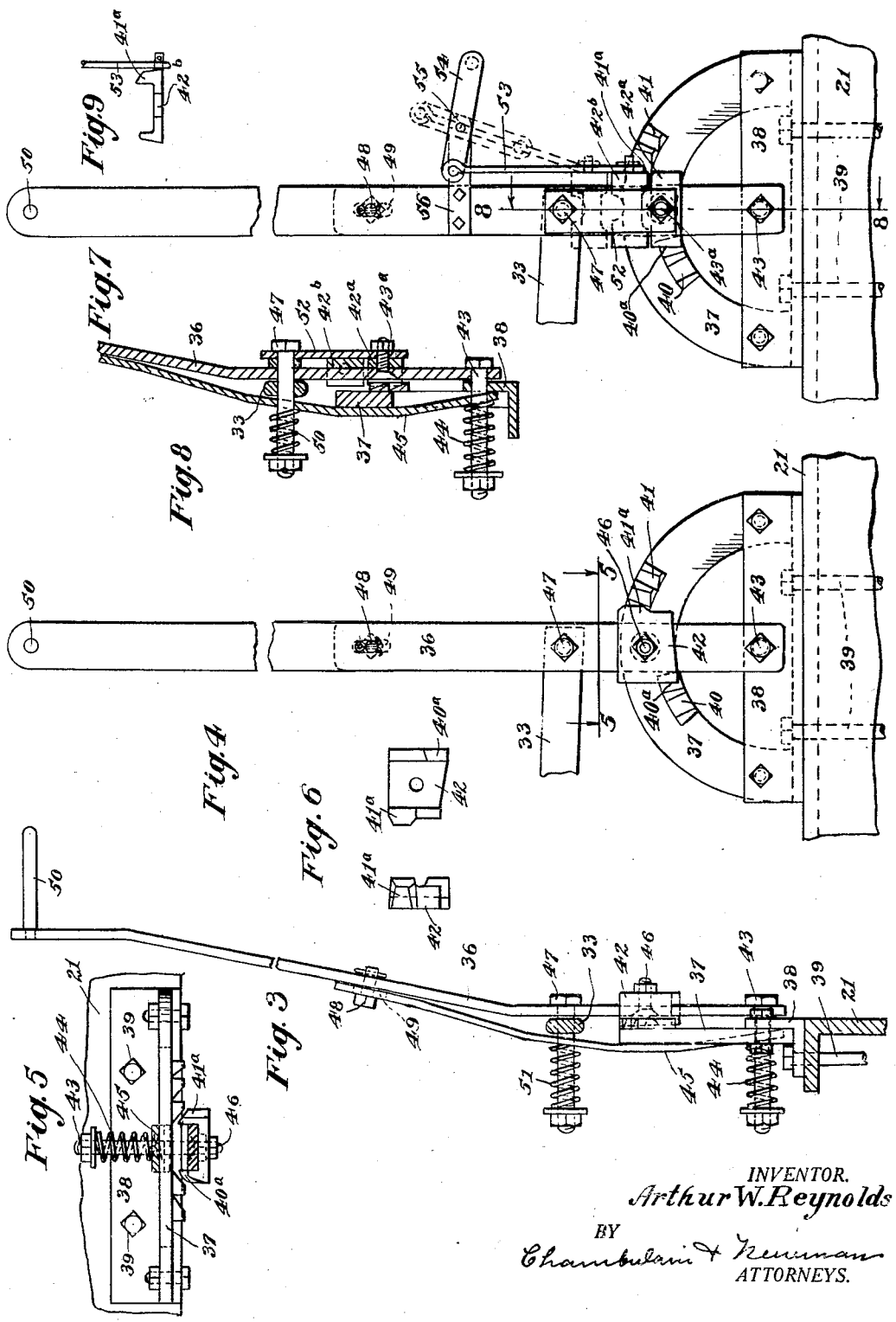

1,832,504

UNITED STATES PATENT OFFICE

ARTHUR W. REYNOLDS, OF LEONARDSVILLE, NEW YORK, ASSIGNOR TO THE BABCOCK MANUFACTURING COMPANY, OF LEONARDSVILLE, NEW YORK, A CORPORATION OF NEW YORK

MEANS FOR OPERATING CULTIVATOR TEETH

Application filed January 9, 1931. Serial No. 507,724.

My invention relates to improvements in cultivators such as multiple row cultivators, weeders, harrows and the like, and especially to the operating means whereby the teeth of the implement may be raised and supported in an elevated position or may be lowered and set to dig into the ground, or adjusted to an intermediate loose or floating position.

An object of the invention is to provide a cultivator operating means that is especially adapted to a cultivator when positioned in front of a tractor and whereby both the tractor and cultivator may be operated by a single attendant and will not require one operator for each machine as is now commonly the case.

The coupling of a cultivator in front of a tractor as herein shown permits the operator to see what is ahead and to drive and steer the machine in a way to better avoid obstructions, and also allows the operator to make shorter and quicker turns and to thereby cultivate closer to fences, and in general to operate the machine to advantage.

A further object of the invention is to provide an operating means, as for raising and lowering cultivator teeth, which may be quickly and conveniently operated by one hand and the adjusted teeth rigidly supported in their adjusted positions so as to not shake loose or whereby the same teeth may be intermediately positioned and allowed to ride freely and lightly through the ground.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawings forming a part of this specification and upon which Fig. 1 shows a side elevation of an improved type of multiple row cultivator, designed by me, and attached to a caterpillar form of tractor in a manner to be positioned and operated forward of the tractor instead of at the rear, as is more commonly practiced;

Fig. 2 shows an enlarged vertical cross section, taken on line 2—2 of Fig. 1, better to illustrate my means of attaching the cultivator to this type of tractor;

Fig. 3 shows, on an enlarged scale, a front sectional elevation of my improved means for operating the cultivator teeth, as seen from line 3—3 of Fig. 1;

Fig. 4 is an enlarged side elevation of the lever operating means, shown in Fig. 3 and as seen from the opposite side of said means, as shown in Fig. 1;

Fig. 5 shows a sectional plan view taken on line 5—5 of Fig. 4;

Fig. 6 shows a detached edge and inner side view respectively of the pawl 42 shown attached to the operating lever in each of the preceding figures;

Fig. 7 is also an inner side elevation similar to Fig. 4 except that it shows a modified form of pawl engaging means;

Fig. 8 shows a central vertical section taken on line 8—8 of Fig. 7; and

Fig. 9 shows a detached top edge view of the slidable pawl employed in the modified structure shown in Fig. 7.

While I have shown my invention applied to one of my improved types of multiple row tractor cultivators, yet it will be obvious that it is equally applicable to my multiple row weeder and in fact numerous other forms of cultivators now upon the market employing a lever operated pawl and ratchet means for raising, lowering and supporting the cultivator teeth in desired positions.

The tractor shown in Fig. 1 illustrates a commercial type of track-laying tractor and includes two pairs of traction wheels 10 and 11, one forward and the other aft, operatively connected by endless chain tracks 12 that travel under and over the said wheels in a manner to support the same and the machine. The axles for these wheels are supported in bearings 13 on the truck frame 14. The opposite outer sides of this frame are enclosed in part with sheet metal guard members 15 which may be attached in any suitable manner, as for instance to the longitudinal channel beams 16 of the truck, and to which the bearings 13 for the axles as well as the other bearings for the track roller frame, are secured. This latter bearing includes a cap 17 which, as indicated in the drawings, projects slightly from the side of the truck frame and since I choose to attach my supporting plates 18 at this point, I provide a hole 19 in said plates to receive this cap 17 which in practice projects slightly therethrough.

One of these plates 18 is attached to the outer face of the opposite sides of the truck frame and each is provided with a smaller hole to receive a bolt 20 for the detachable connection of the rear end of the push beam 21, as used on a cultivator when attached in front of a tractor, or a draw beam of an implement when hitched behind the tractor.

The push beam 21 forming a part of the cultivator frame is hingedly connected to these plates 18 secured to opposite sides of the rear part of the tractor frame by angle plates 22 and bolts 23 (see Figs. 1 and 2) and whereby a detachable hinged connection is provided.

Referring more particularly to Fig. 1 it will be seen that the cultivator includes as a part of its frame a pair of horizontally disposed push beams 21 whose forward ends are rigidly secured to the cross beam 24 of the cultivator and whose rear ends are hingedly connected to the before mentioned bolts 20 in the plates 18 on opposite sides of the tractor. The cultivator further includes wheels 25 which are swiveled to the cross beam so that the cultivator is free to be shoved ahead of and by the tractor and also to be swung to either the right or left for turning, as with the turning of the tractor. In this connection it will be seen that I have attached a bearing plate 26 (see Fig. 1) to the front part of the tractor, that includes vertical end guides against which the side of the draw bars 21 bear and slide during the travel of the implements. A series of arms 27 are secured to a tooth bar 28 that support the cultivator teeth 29, the forward ends of said arms being hingedly connected as at 30 to a bracket 31 secured to the cross beam 24, whereby the bar 28, its teeth and connected parts are raised and lowered. Two or more upwardly disposed arms 32 are rigidly secured to the tooth bar 28 so that the same and its teeth may be raised and lowered through the links 33 connected to its upper end. Springs 34 serve to counterbalance the weight of the rocker bar 28 and its cultivator teeth by having their upper ends connected to the upper end portions of the arms 32 and their other ends attached to a bracket 35 fixed to the cross beam 24.

The particular form of cultivator herein shown is provided with two operating devices, one on the hinged end of each beam 21 and positioned on each side of the driver so that one may be operated by the right hand and the other by the left hand of the driver, and either singly or simultaneously as desired. In this respect it will be apparent that owing to the use of the springs 34 which serve to counterbalance the weight of the cultivator teeth, comparatively little effort is required to manipulate the operating levers 36.

The two operating means as employed on the multiple row cultivator herein shown are alike in construction, except that one is a right and the other a left. One is employed on one side of the machine as shown in Fig. 1 and the other on the opposite side, directly behind the operating means seen in Fig. 1. In this respect it should also be borne in mind that in practice both of these operating means would be operated together, or at substantially the same time, in which case the operating lever of each would be in like positions and the teeth carried by the long rocker beam would be similarly positioned with respect to the ground.

This operating means comprises a circular form of sector 37 which as shown may be secured to a base in the form of an angle plate 38 by means of bolts 39 or said base may be formed integral with the sector if desired. The sector includes an inner or lower series of teeth 40 on the inner side of its forward quarter and a second series of teeth 41 in the same side of its rear quarter. The shoulders of the teeth of each series are at the outer ends of the teeth so as to make the respective series engageable by the oppositely acting teeth of the double toothed pawl 42 according to the position of the operating lever 36. The operating lever referred to is hingedly connected to the base 38 as by means of a relatively long bolt 43 and upon the outer end portion of this bolt is mounted a compression spring 44 that serves to yieldably hold the lower end portion of the flat spring member 45 up against the said base plate to form a yieldable hinged connection of the lever with said base plate.

The pawl 42 before referred to is secured to the inner side of the operating lever 36 by means of a bolt 46, and as is more clearly shown in Figs. 5 and 6, said pawl includes two teeth 40$^a$ and 41$^a$, the former for engagement with the lower series of sector teeth 40 and the other for engagement with the upper series of sector teeth 41. The tooth 40$^a$ is brought into engagement with the sector teeth 40 by a forward movement of the operating lever 36, see dotted line c, Fig. 1, as in supporting the cultivator teeth 29 in elevated positions while a backward movement of said operating lever, as indicated by dotted lines d in Fig. 1, would bring the tooth 41ª into engagement with the rear teeth 41 in a manner to hold the cultivator teeth down in the ground.

The flat spring member 45 is disposed longitudinally of the operating lever, and is connected therewith at three points so as to be operated thereby. Its lower end is connected, as before stated, by means of the bolt 43 while its intermediate portion is connected by a similar bolt 47. The upper end portion of this flat spring member 45 is slidably connected with the operating lever 36 by a pin and cotter 48 carried by the lever and extending through a slot 49 in the upper end of the said spring. The purpose of the slot is to allow free outward movement of the spring to disengage the teeth 40ª and 41ª from the sector teeth when pressure is applied to the handle 50 on the upper end of the said lever 36. It will further be seen that the bolts 43 and 47 are relatively long and are provided with springs 44 and 51, one end of each of which is seated against the face of the flat spring member 45 and the other end against a nut mounted upon the outer threaded end of said bolt.

The purpose of these springs 44 and 51 are to yieldably hold the toothed pawl 42 against the side of the sector 37 and to insure engagement of its teeth with those of the two series of teeth 40 and 41, yet at the same time to permit of the disengagement of either or both of said last mentioned teeth, as may be desired according to whether the hand lever 36 be operated in a forward or backward direction. The tooth 41ª of the pawl 42 is positioned adjacent the rear and top edges while the tooth 40ª is diagonally located adjacent the bottom and front edges. The last mentioned tooth holds the lever forward locked against backward movement and the cultivator teeth in elevated position, while the upper tooth 41ª acts in a reversed manner to hold the cultivator teeth in the ground. With the lever locked in this way against backward movement to hold the teeth elevated, a forward shove upon the free end portion of the handle 50 will tend not only to shove the operating lever 36 forward, but due to its yieldable spring mounting it will twist slightly, or pry open, better to effect the disengagement of the pawls 40ª and 41ª from the series of teeth of the sector whereupon the lever is then free for further forward or backward adjustment. What has been said with reference to the lower series of teeth 40 and the engaging tooth 40ª is, in a sense, true of the upper series of teeth 41 for the positioning of the cultivator teeth in the ground.

A modified form of construction is shown in Figs. 7, 8 and 9, which accomplishes the same purpose but whereby the cultivator teeth may be permitted to float or ride lightly upon the surface of the ground. This object, as will be seen, is accomplished by making the pawl in two parts, 42ª and 42ᵇ, the former being fixed to the operating lever by means of a bolt 43ª and the latter being movable with respect to said fixed member. In this form of construction the tooth 41ª is on the movable pawl 42ᵇ while the tooth 40ª is on the fixed member 42ª. The sector and its teeth are the same as in the other construction, as is also the lever 36 and its spring 45. I have included in this form, however, a short plate 52 which is disposed lengthwise of the operating lever and held in position by means of the bolt 43ª and the bolt 47 and which plate serves to hold the movable pawl 42ᵇ in slidable engagement with the operating lever so that the pawl may be raised from the position shown in full lines in Figs. 7 and 8 to the position shown in dotted lines in Fig. 7 and out of the path of an engagement with the upper series of teeth 41. This movable pawl may be operated in any suitable manner as for instance, through a link connection 53 with a lever 54 pivoted at 55 to a fixed bracket 56. In Fig. 7 the lever 54 and its pawl are shown in their normal position in full lines and in disengaged position in dotted lines.

While the teeth 29 of the cultivator are not permitted to float when connected through the operating means shown in Figs. 3, 4, 5 and 6, yet I find that in some instances, especially when lighter teeth, such as weeder teeth, are used it may be desirable to have the teeth float instead of being locked down, in which case the operating means shown in modified form in Figs. 7, 8 and 9 would be preferable.

It is also possible with my improved operating means to draw a second implement, such as a weeder in the rear of the tractor and to operate the teeth thereof, if necessary, from the same operating means, in which case it would be but necessary to connect the draw bars of the weeder, not shown, to the pivotal bolts 20 and to attach the operating links, not shown, to the bolts 47 carried by the operating lever 36, and to which the before mentioned links 33 are hingedly connected.

Having thus described my invention, what I claim and desire to secure by Letters Patent is:

1. In a cultivator, a frame including a beam, cultivator teeth adjustably mounted on the frame, a sector secured to the beam and having two series of ratchet teeth, the shoulders of one set of teeth being in opposed relation to those of the other set, an operating lever hingedly connected to the sector, a pawl carried by the lever and bearing a tooth for engagement with each of the two series of ratchet teeth, one engagement to hold the lever in a forward position and the other to hold it in a reverse position, and spring means between the lever and sector below and above the pawl to form a yieldable engagement of the pawl with the sector teeth.

2. In a cultivator, a frame including a beam, cultivator teeth adjustably mounted on the frame, a sector secured to the beam forming substantially a half circle, a series of ratchet teeth in each of the two quarters of the sector, one of the series being adjacent the outer edge and the other series being near the inner edge of the sector, an operating lever hingedly connected to the apex of the sector, a pawl carried by the lever and bearing two teeth, one for engagement with each of the two series of ratchet teeth, and spring means to form a yieldable engagement of the pawl with the sector teeth.

3. The combination with a tractor having opposed bolts, one on each side, of a cultivator comprising cultivator teeth, a frame including two parallel beams, one positioned on each side of the tractor and pivotally connected to the said bolts, a sector secured to the beam and having two spaced-apart series of teeth, the shoulders of one set of teeth being opposed to those of the other set, an operating lever hingedly connected to the sector, means connecting the operating lever and cultivator teeth, a toothed pawl carried by the lever having one tooth for engagement with one series of teeth and another tooth to engage the other series of teeth, means for holding said pawl in yieldable engagement with the sector.

4. In a cultivator, a frame including a beam, cultivator teeth adjustably mounted on the frame, a sector secured to the beam forming substantially a half circle, a series of ratchet teeth on each of the two quarters of the sector, one adjacent its outer edge and the other adjacent its inner edge, an operating lever hingedly connected to the apex of the sector, a link connecting the lever and cultivator teeth, a pawl carried by the lever and bearing a tooth for engagement with each of the two series of ratchet teeth, and spring means to form a yieldable engagement of the pawl with the sector teeth.

5. The combination with a tractor having opposed bolts one on each side, of a cultivator comprising a frame including two beams, one positioned on each side of the tractor and pivotally connected to the said bolts, a sector secured to the beam and having two spaced-apart series of teeth on its side, an operating lever hingedly connected to the same side, a flexible strip hingedly connected to the opposite side, means connecting the lever and cultivator, a toothed pawl carried by the lever, one tooth for engagement with one series of teeth and another tooth to engage the other series of teeth, means for yieldably holding the lever and strip together and the said pawl in yieldable engagement with the sector.

6. In a cultivator tooth operating means, the combination with a sector having a series of teeth, an operating lever hinged to the sector and carrying a pawl for engagement with the teeth, a flexible strip, one end of which is hingedly connected to the hinge for the lever, and the other end slidably connected to the upper end of the lever, one or more springs to yieldably hold the strip and lever together and the pawl in engagement with the teeth in a way to permit the lever and pawl to be operated with respect to the sector and held in adjusted positions.

7. The combination in a cultivator comprising a frame including a beam and adjustably mounted cultivator teeth, a sector secured to the beam having two series of ratchet teeth, an operating lever hingedly connected to the sector, a pawl carried by the lever bearing a sector tooth for engagement with each of the series of teeth, a spring interposed between the pivot point of the lever and sector to provide a yieldable connection of the pawl with the ratchet teeth, a flexible strip one end of which is secured to said pivot of lever to sector, and the other slidably connected to the upper end of the lever to form a further flexible holding means of the pawl with the ratchet teeth.

8. In a cultivator tooth operating means, the combination with a sector forming substantially a half circle and having a series of ratchet teeth in each of the two quarters of the sector, one adjacent its outer edge and the other adjacent its inner edge, an operating lever hingedly connected to the apex of the sector, a pawl carried by the lever and bearing a tooth for engagement with one series of ratchet teeth, a second pawl movably mounted on the lever for engagement with the other series of pawl, means to move the movable pawl on the lever and out of possible engagement with the ratchet teeth, and spring means to form a yieldable engagement of the pawl with the sector teeth.

9. In a cultivator tooth operating means, the combination with a sector forming substantially a half circle and having a series of ratchet teeth in each of its two quarters, one adjacent its outer edge and the other adjacent its inner edge, an operating lever hingedly connected to the apex of the sector, a pawl carried by the lever and bearing a tooth for engagement with one series of ratchet teeth, a second pawl movably mounted on the lever for engagement with the other series of pawl, a flexible strip having one end hinged to the apex of the sector and its other end slidably connected to the outer portion of the lever, means to move the movable pawl on the lever into and out of possible engagement with the ratchet teeth, and spring means to form a yieldable engagement of the pawls with the sector teeth.

Signed at Leonardsville, in the county of Madison and State of New York, this 6th day of January, A. D. 1931.

ARTHUR W. REYNOLDS.